US 9,784,951 B2

(12) United States Patent
Ichimura

(10) Patent No.: US 9,784,951 B2
(45) Date of Patent: Oct. 10, 2017

(54) IMAGING OPTICAL SYSTEM UTILIZING A RE-IMAGING METHOD AND IMAGE PROJECTION APPARATUS INCLUDING THE SAME

(71) Applicant: CANON KABUSHIKI KAISHA, Tokyo (JP)

(72) Inventor: Junya Ichimura, Utsunomiya (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 14/610,227

(22) Filed: Jan. 30, 2015

(65) Prior Publication Data
US 2015/0234157 A1    Aug. 20, 2015

(30) Foreign Application Priority Data
Feb. 14, 2014    (JP) ................. 2014-026485

(51) Int. Cl.
*G02B 9/60*    (2006.01)
*G02B 13/16*    (2006.01)
(Continued)

(52) U.S. Cl.
CPC ............ *G02B 13/16* (2013.01); *G02B 13/04* (2013.01); *G03B 3/00* (2013.01)

(58) Field of Classification Search
CPC .......... G02B 21/02; G02B 13/00; G02B 9/34; G02B 13/08; G02B 13/18; G02B 15/177;
(Continued)

(56) References Cited

U.S. PATENT DOCUMENTS 5,748,385 A    5/1998  Miyano
7,224,535 B2*  5/2007  Neil .................. G02B 13/14
                                                           359/357
(Continued)

FOREIGN PATENT DOCUMENTS

CN    101320125 A    12/2008
JP    2005-004074 A   1/2005
(Continued)

OTHER PUBLICATIONS

European Search Report issued in corresponding application No. 15000384.6 on Jul. 22, 2015.
(Continued)

*Primary Examiner* — Bumsuk Won
*Assistant Examiner* — Henry Duong
(74) *Attorney, Agent, or Firm* — Carter, DeLuca, Farrell & Schmidt, LLP

(57) ABSTRACT

Provided is an imaging optical system including, in order from an enlargement conjugate side to a reduction conjugate side: a first lens unit having a negative refractive power; a second lens unit having a positive refractive power; a third lens unit having a positive refractive power; a fourth lens unit having a negative refractive power; and a fifth lens unit having a positive refractive power. In the imaging optical system, both of an enlargement conjugate point on the enlargement conjugate side and a reduction conjugate point on the reduction conjugate side are conjugate with an internal intermediate imaging position. The first lens unit and the fifth lens unit are stationary for focusing. The second lens unit, the third lens unit, and the fourth lens unit move on loci different from one another during the focusing.

23 Claims, 7 Drawing Sheets

(51) Int. Cl.
*G02B 13/04* (2006.01)
*G03B 3/00* (2006.01)

(58) Field of Classification Search
CPC ........ G02B 13/04; G02B 13/22; G02B 13/16;
G02B 15/14; G02B 15/16; G02B 27/646;
G02B 13/009; G02B 15/173; G02B
15/17; G02B 15/163; G02B 9/60
USPC ................ 359/649, 648, 680–682, 684, 676
See application file for complete search history.

(56) References Cited

U.S. PATENT DOCUMENTS

| | | |
|---|---|---|
| 2005/0088762 A1 | 4/2005 | Ohashi |
| 2007/0121214 A1 | 5/2007 | Kuo |
| 2008/0285142 A1 | 11/2008 | Kuo |
| 2013/0215519 A1* | 8/2013 | Inoue ..................... G02B 13/16 359/683 |
| 2014/0036142 A1 | 2/2014 | Inoko |
| 2014/0126067 A1* | 5/2014 | Nagahara ............. G02B 15/177 359/663 |

FOREIGN PATENT DOCUMENTS

| | | |
|---|---|---|
| JP | 2011-017984 A | 1/2011 |
| TW | I263074 B | 10/2006 |
| TW | 200708793 A | 3/2007 |
| TW | 200846695 A | 12/2008 |

OTHER PUBLICATIONS

Chinese Office Action issued in connection with corresponding Chinese Application No. 201510078537.4, dated Sep. 26, 2016 (17 pages including English translation).

* cited by examiner

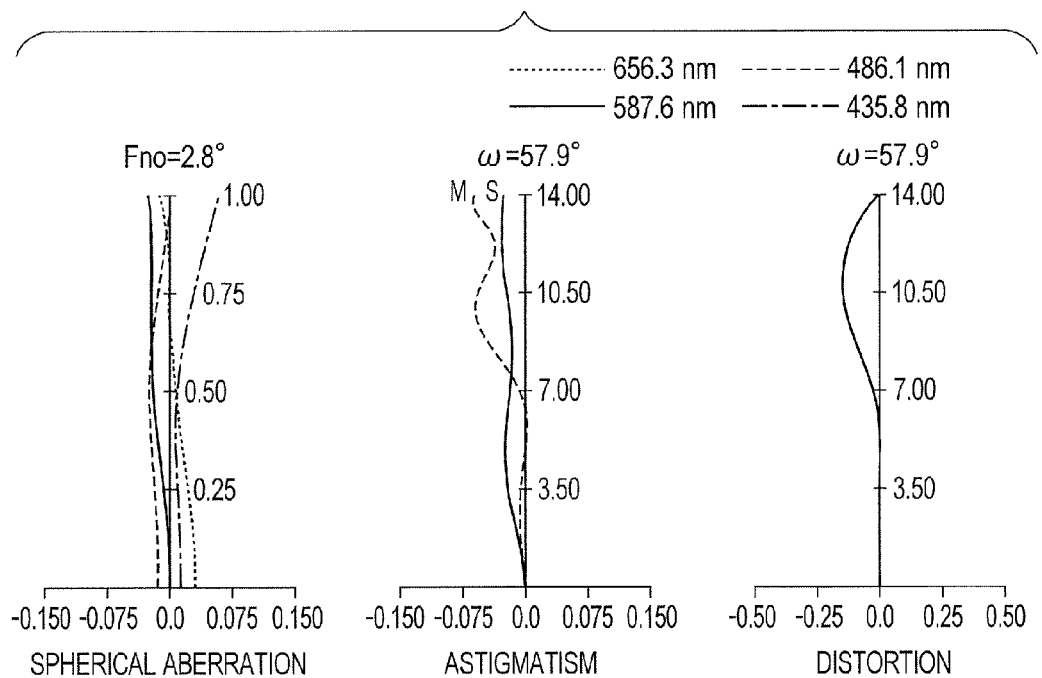
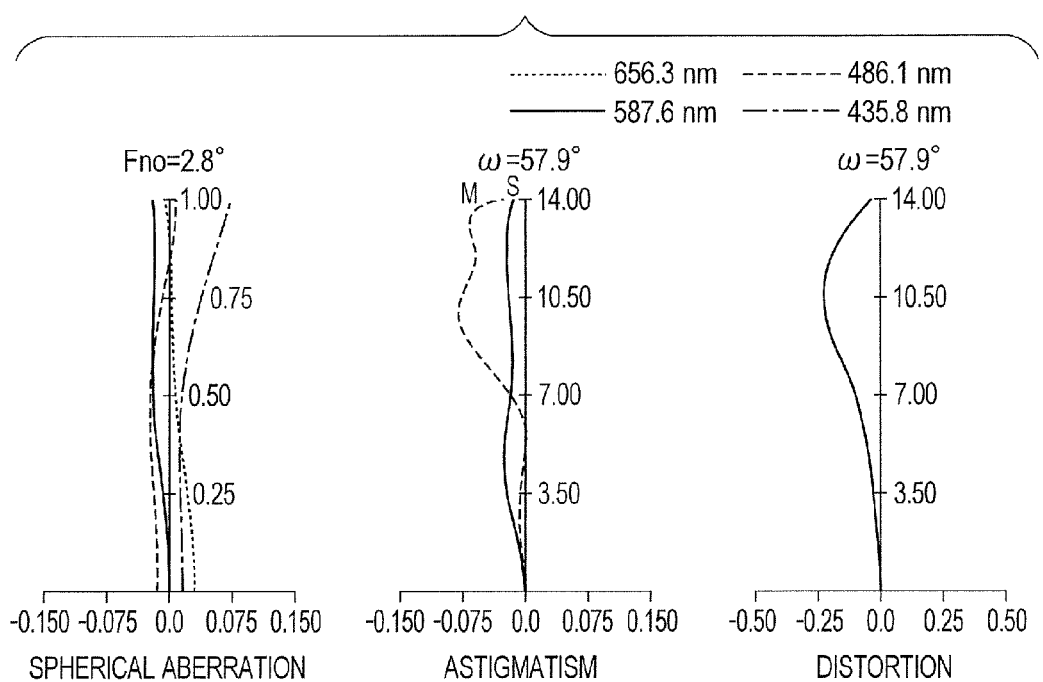

OBJECT DISTANCE 840mm

OBJECT DISTANCE 3600mm

OBJECT DISTANCE 840mm

OBJECT DISTANCE 3600mm

IMAGING OPTICAL SYSTEM UTILIZING A RE-IMAGING METHOD AND IMAGE PROJECTION APPARATUS INCLUDING THE SAME

BACKGROUND OF THE INVENTION

Field of the Invention

The present invention relates to an imaging optical system having such an optical action that a light flux emitted from a certain point on an enlargement conjugate side is imaged at an intermediate imaging position, and is thereafter re-imaged on a reduction conjugate side, and to an image projection apparatus including the imaging optical system.

Description of the Related Art

In recent years, imaging optical systems to be used for an image pickup apparatus such as a digital camera and an image projection apparatus such as a projector have been required to have a compact entire system, a wide angle of field, and highly accurate optical performance over every object distance. An imaging optical system that utilizes the following intermediate imaging method (re-imaging method) is known to meet those requirements. Specifically, an enlargement conjugate point (object point) on an enlargement conjugate side (object side) is imaged on a reduction conjugate side (image side) in a manner that the enlargement conjugate point is once imaged at an intermediate imaging position within the optical system and is thereafter re-imaged at a reduction conjugate point.

In U.S. Pat. No. 5,748,385, there is disclosed an endoscope objective lens configured so that a primary image of a subject is formed by a front lens unit and then a secondary image of the subject is formed by a rear lens unit through a field lens. In U.S. Pat. No. 5,740,385, the rear lens unit is switched between two lens positions so as to vary an observation field of angle.

In US Patent Application Publication No. 2005/0080762, there is disclosed a superwide angle lens configured so that an image of a subject is formed on a primary imaging plane arranged in the vicinity of a field stop by an objective lens unit and the image formed on the primary imaging plane is re-imaged on a re-imaging plane (imaging element plane) by a relay lens unit. In US Patent Application Publication No 2005/0088762, the objective lens and a part or all of lens of the relay lens unit move to perform focusing. In addition, an image pickup element moves to perform focusing.

In Japanese Patent Application Laid-Open No. 2011-17984, there is disclosed an image pickup apparatus configured so that an afocal optical system is removably mounted on an object side of an imaging optical system. The afocal optical system includes, in order from the object side, an objective optical system, a field lens, and a correction lens unit.

A light flux from the object side is imaged in the vicinity of the field lens by the objective optical system, and is thereafter guided to the imaging optical system as collimated light by the correction lens unit. Then, the image formed in the vicinity of the field lens is re-imaged on an imaging plane by the imaging optical system. The correction lens unit and a part of lens units of the imaging optical system move to perform focus adjustment (focusing).

SUMMARY OF THE INVENTION

According to one embodiment of the present invention, there is provided an imaging optical system including, in order from an enlargement conjugate side to a reducton conjugate side: a first lens unit having a negative refractive power; a second lens unit having a positive refractive power; a third lens unit having a positive refractive power; a fourth lens unit having a negative refractive power; and a fifth lens unit having a positive refractive power. In the imaging optical system, both of an enlargement conjugate point on the enlargement conjugate side and a reduction conjugate point on the reduction conjugate side are conjugate with an internal intermediate imaging position. The first lens unit and the fifth lens unit are configured to be stationary for focusing. The second lens unit, the third lens unit, and the fourth lens unit are configured to move on loci different from one another during the focusing.

Further features of the present invention will become apparent from the following description of exemplary embodiments with reference to the attached drawings.

BRIEF DESCRIPTION OF THE DRAWINGS

FIG. 2B is an aberration diagram of the imaging optical system according to Example 1 of the present invention at an object distance of 840 mm.

FIG. 2C is an aberration diagram of the imaging optical system according to Example 1 of the present invention at an object distance of 3,600 mm.

DESCRIPTION OF THE EMBODIMENTS

Figure 1:
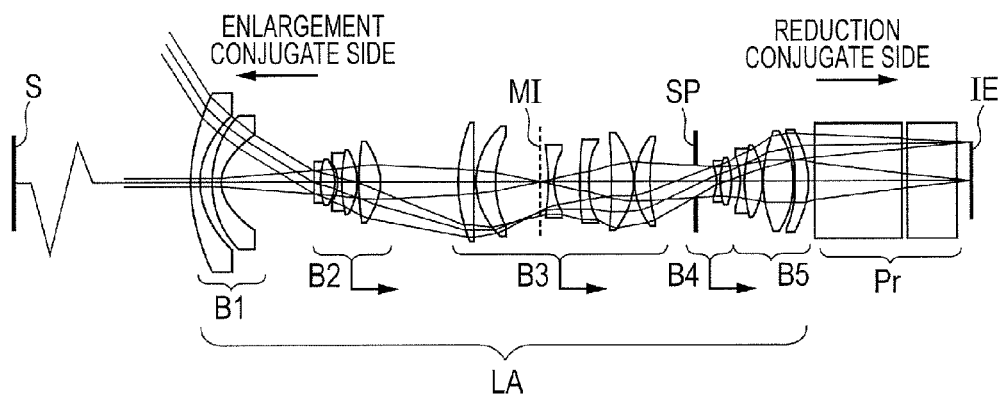
FIG. 1 is a lens sectional diagram of an imaging optical system according to Example 1 of the present invention.

Preferred embodiments of the present invention will now be described in detail in accordance with the accompanying drawings.

In an imaging optical system utilizing a re-imaging method, it is important to appropriately set a lens configuration, a focus method for focusing from infinity to a close distance, and other such factors. For example, it is important to appropriately set the number of lens units in the imaging optical system and the refractive powers of the lens units, set an intermediate imaging position in an optical path at which a light flux is re-imaged, and select a lens unit to be moved for focusing. If those configurations are inappropriate, aberration variations are increased in focusing, resulting in difficulty obtaining high optical performance over every object distance with a wide angle of field while downsizing the entire system.

It is an object of the present invention to provide an imaging optical system utilizing a re-imaging method, which has high optical performance over every object distance with a wide angle of field and which is easy to downsize the entire system, and an image projection apparatus including the imaging optical system. An imaging optical system according to each of Examples of the present invention is described below. The imaging optical system according to the present invention includes, in order from an enlargement conjugate side to a reduction conjugate side, a first lens unit having a negative refractive power, a second lens unit having a positive refractive power, a third unit having a positive refractive power, a fourth lens unit having a negative refractive power, and a fifth lens unit having a positive refractive power. Then, the imaging optical system has such an optical action that an enlargement conjugate point on the enlargement conjugate side as imaged at an intermediate imaging position and an image formed at the intermediate imaging position is re-imaged on a reduction conjugate point on the reduction conjugate side.

Specifically, the imaging optical system according to the present invention is an imaging optical system in which both the enlargement conjugate point on the enlargement conjugate side and the reduction conjugate point on the reduction conjugate side are conjugate with the internal intermediate imaging position. During focusing of the enlargement conjugate point from a far distance to a close distance, the first lens unit and the fifth lens unit are stationary, and each of the second lens unit, the third lens unit, and the fourth lens unit moves with changing a distance between that and an adjacent lens unit.

In other words, each of the second lens unit, the third lens unit, and the fourth lens unit moves on locus different from those of all other lens units during focusing.

Now, the case where the imaging optical system according to each of Examples is applied to a projection optical system to be used for of projector (image projection apparatus) for projecting an original image displayed on an image displaying element such as a liquid crystal panel onto a screen is described.

Figure 2A:
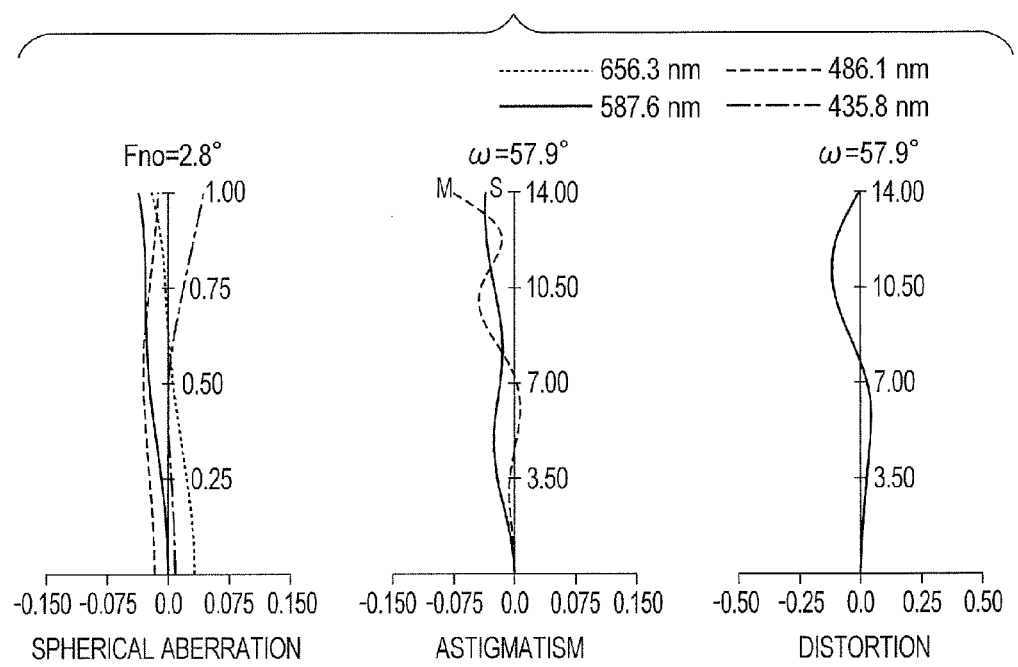
FIG. 2A is an aberration diagram of the imaging optical system according to Example 1 of the present invention at an object distance of 480 mm.

FIG. 1 is a lens sectional diagram of an imaging optical system according to Example 1 of the present invention. FIGS. 2A, 2B and 2C are aberration diagrams of the imaging optical system according to Example 1 of the present invention at projection distances of 480 mm, 840 mm, and 3,600 mm, respectively. As used herein, the projection distance is a distance from the image displaying element to a screen surface when Numerical Examples are expressed in units of mm. The same holds true for Examples.

Figure 3:
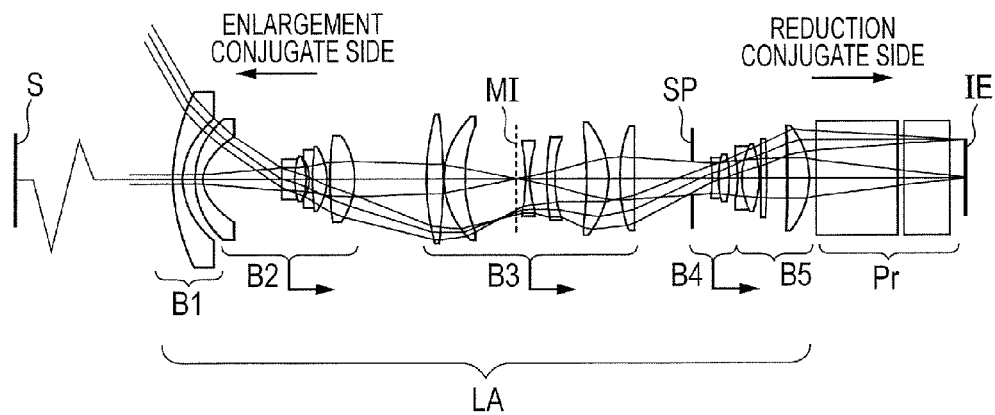
FIG. 3 is a lens sectional diagram of an imaging optical system according to Example 2 of the present invention.
Figure 4A:
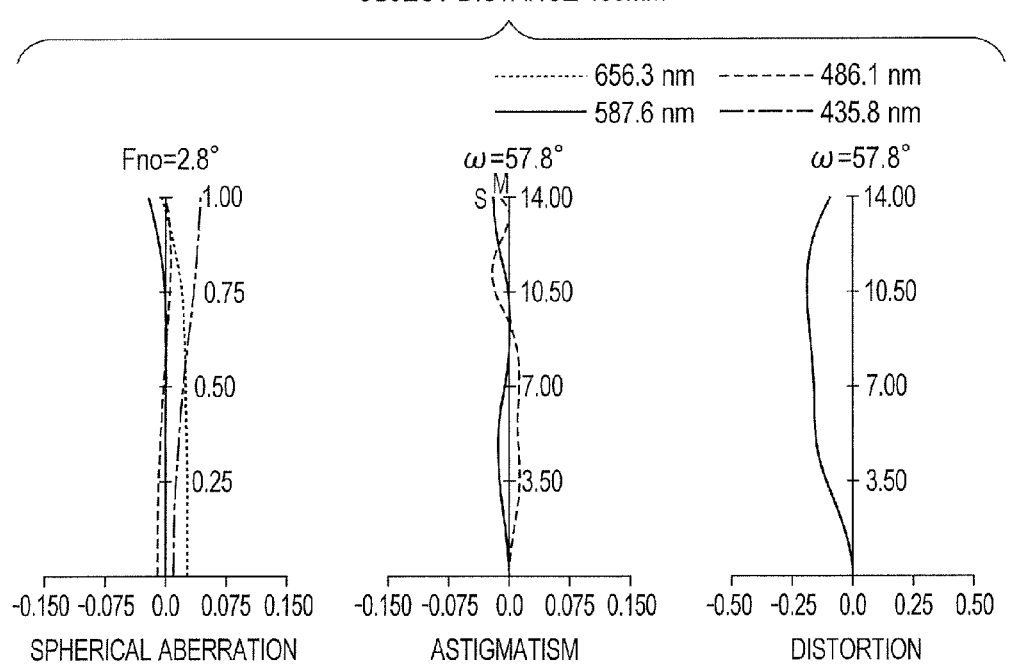
FIG. 4A is an aberration diagram of the imaging optical system according to Example 2 of the present invention at an object distance of 480 mm.
Figure 4B:
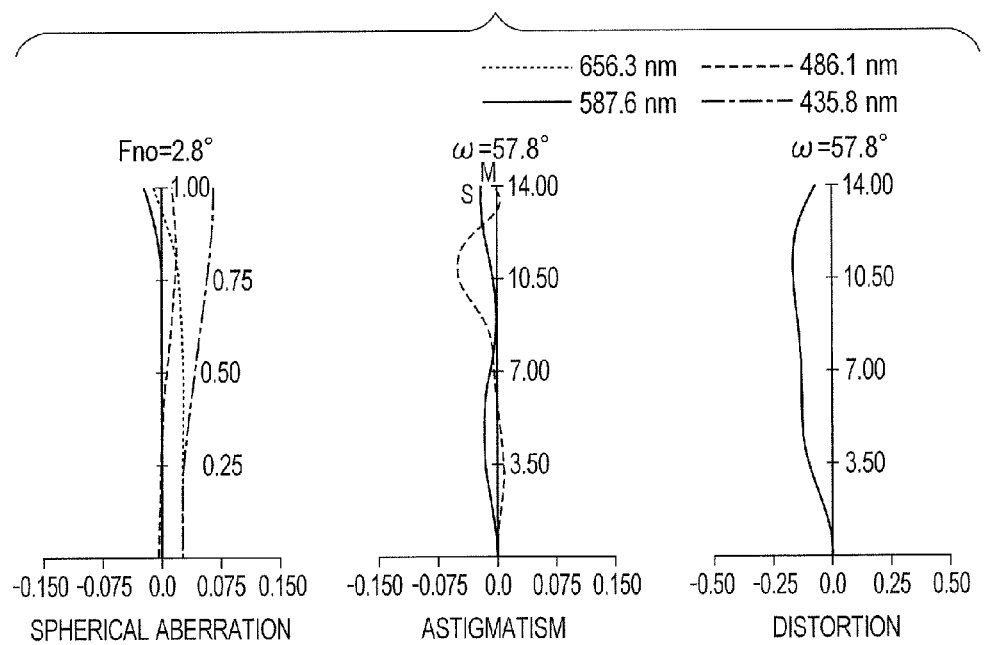
FIG. 4B is an aberration diagram of the imaging optical system according to Example 2 of the present invention at an object distance of 840 mm.
Figure 4C:
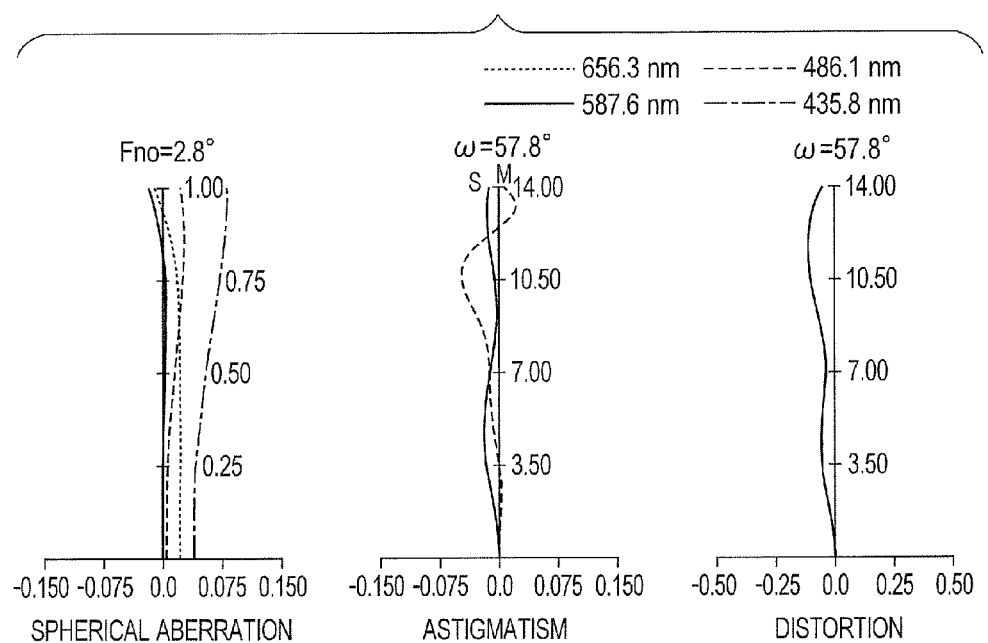
FIG. 4C is an aberration diagram of the imaging optical system according to Example 2 of the present invention at an object distance of 3,600 mm.
Figure 5:
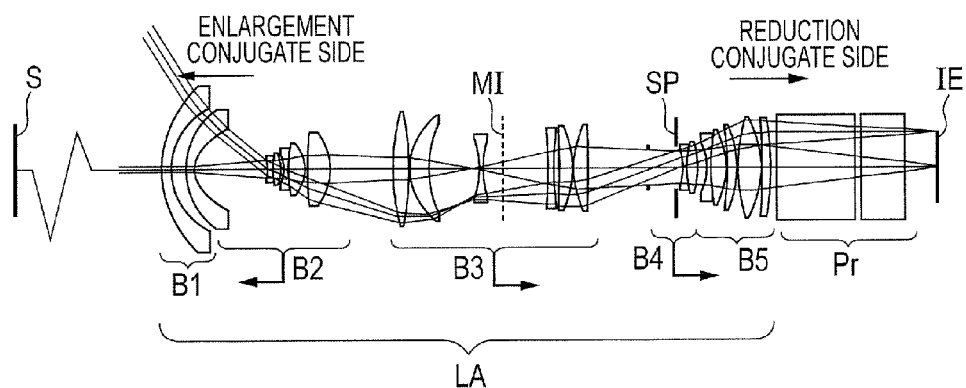
FIG. 5 is a lens sectional diagram or an imaging optical system according to Example 3 of the present invention.
Figure 6A:
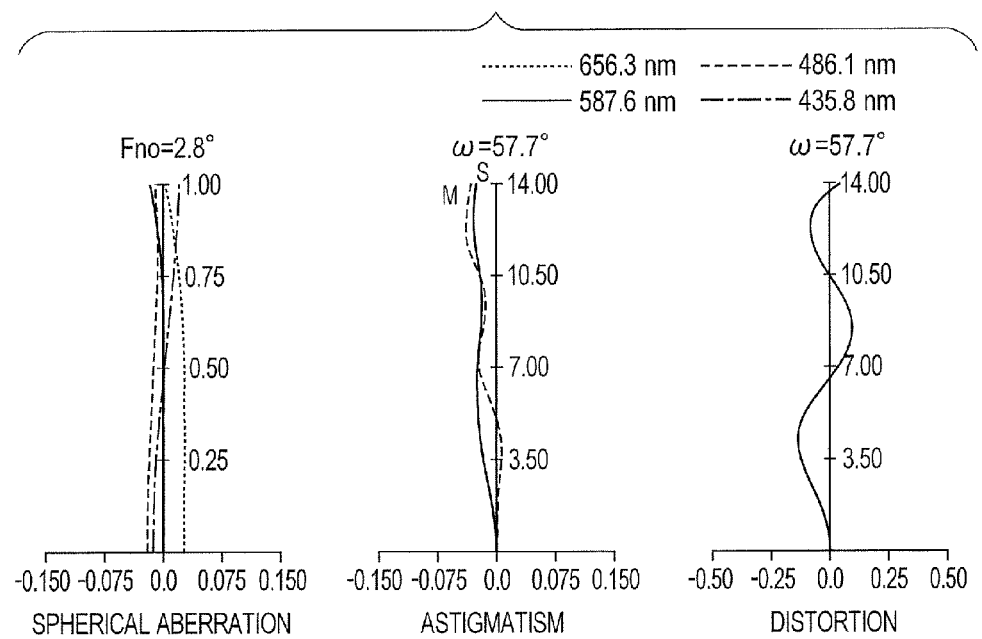
FIG. 6A is an aberration diagram of the imaging optical system according to Example 3 of the present invention at an object distance of 480 mm.
Figure 6B:
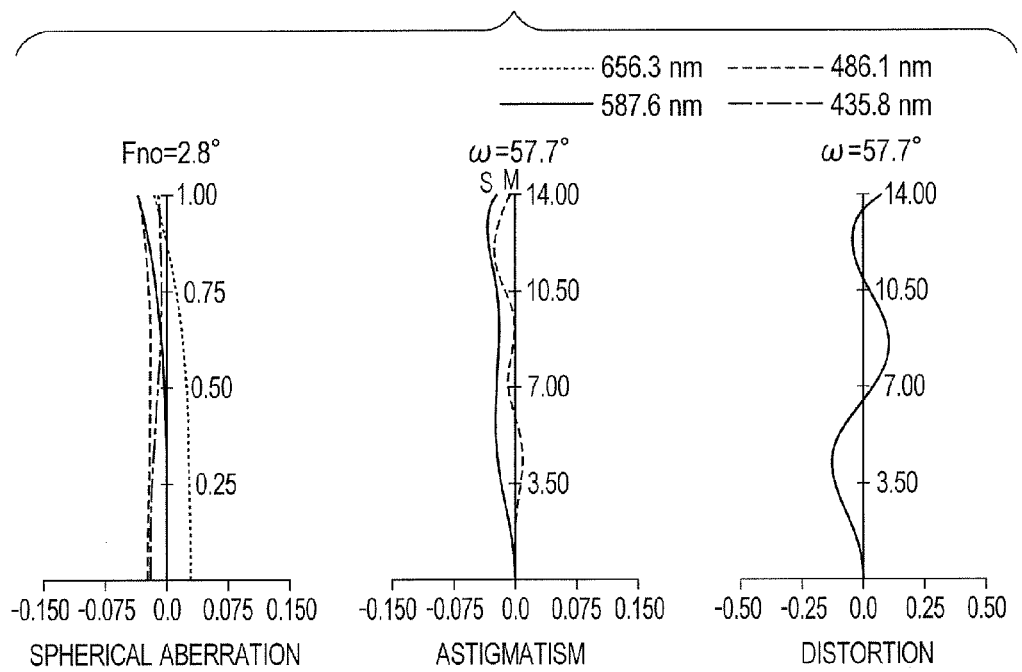
FIG. 6B is an aberration diagram of the imaging optical system according to Example 3 of the present invention at an object distance of 840 mm.
Figure 6C:
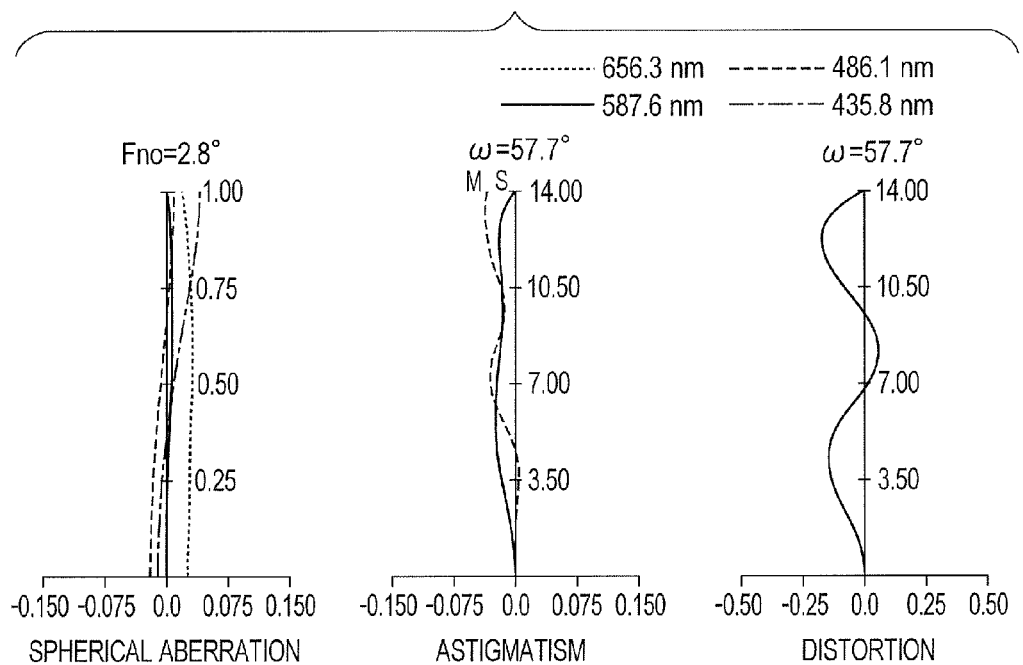
FIG. 6C is an aberration diagram of the imaging optical system according to Example 3 of the present invention at an object distance of 3,600 mm.
Figure 7:
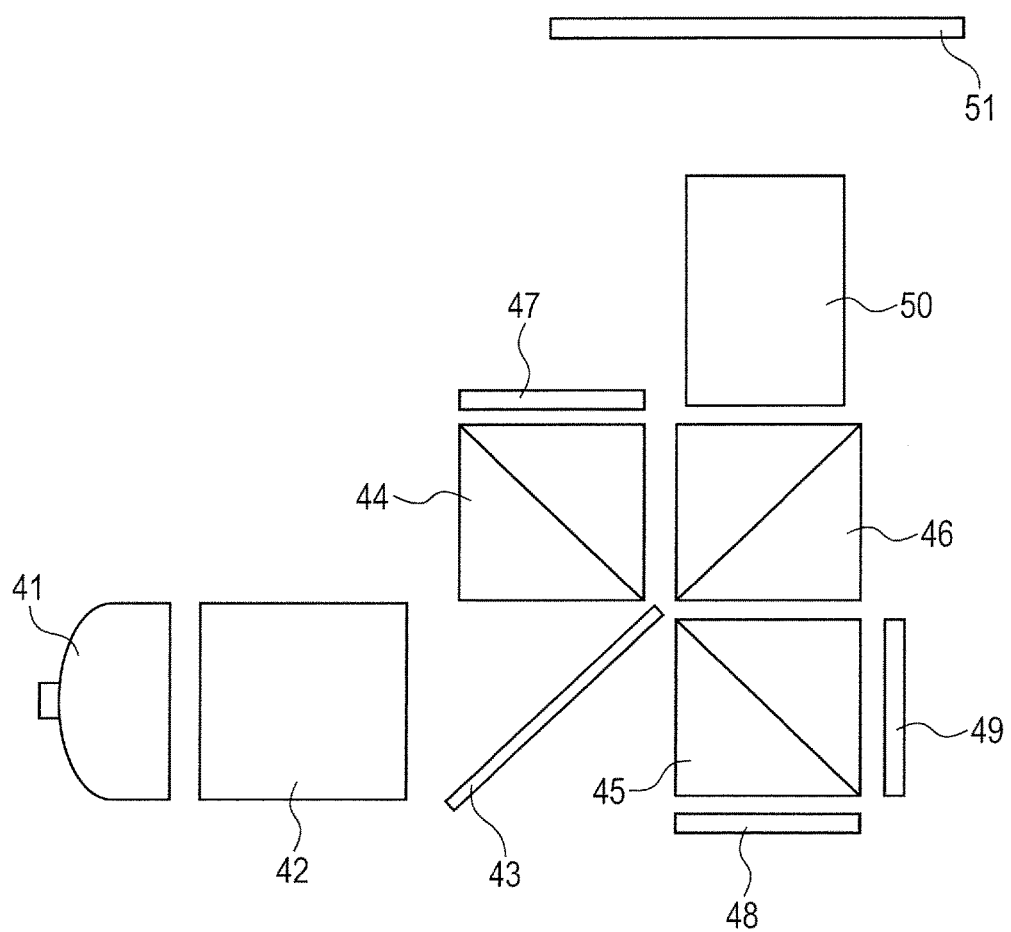
FIG. 7 is a schematic diagram illustrating a main part of an image projection apparatus according to the present invention.

FIG. 3 is a lens sectional diagram of an imaging optical system according to Example 2 of the present invention. FIGS. 4A, 4B, and 4C are aberration diagrams of the imaging optical system according to Example 2 of the present invention at projection distances of 480 mm, 840 mm, and 3,600 mm, respectively. FIG. 5 is a lens sectional diagram of an imaging optical system according to Example 3 of the present invention. FIGS. 6A, 6B, and 6C are aberration diagrams of the imaging optical system according to Example 3 of the present invention at projection distances of 480 mm, 840 mm, and 3,600 mm, respectively. FIG. 7 is a schematic diagram illustrating a main part of an image projection apparatus including the imaging optical system according to the present invention.

The imaging optical system illustrated in each of Examples is a projection lens (projection optical system) to be used for an image projection apparatus (projector). In the lens sectional diagram, the left side is an enlargement conjugate side (screen) (front), and the right side is a reduction conjugate side (image displaying element side) (rear). Symbol LA represents the imaging optical system. Symbol Bi represents an i-th lens unit, where i represents the order of the lens unit counted from the enlargement conjugate side. Symbol SP represents an aperture stop. An original image (image to be projected) IE, such as a liquid crystal panel (image displaying element), corresponds to a reduction conjugate point on the reduction conjugate side.

A screen surface S corresponds to an enlargement conjugate point on the enlargement conjugate side. An optical block Pr corresponds to a prism for color separation or color composition, an optical filter, a faceplate (parallel plate glass), a crystal low pass filter, an infrared cut filter, or the like. Symbol MI represents an intermediate imaging position at which the enlargement conjugate point is primarily imaged. In other words, symbol MI represents an intermediate imaging plane arranged between an enlargement conjugate plane and a reduction conjugate plane, at which an intermediate image is formed. The arrows each represent the direction of movement (locus of movement) of each lens unit for focusing of the enlargement conjugate point from a far distance to a close distance.

In the aberration diagrams, symbol Fno represents an F-number and symbol ω represents a half angle of field (degree). In the spherical, aberration diagrams, the chain line represents a wavelength of 435.8 nm, the broken line represents a wavelength of 486.1 nm, the solid line represents a wavelength of 587.6 nm, and the dotted line represents a wavelength of 656.3 nm. In the astigmatism diagrams, the broken line represents a meridional image plane at a wavelength of 587.6 nm, and the solid line represents a sagittal image plane at a wavelength of 587.6 nm. The distortion diagrams are shown for a wavelength of 587.6 nm. The spherical aberration and the astigmatism are shown in the scale of 0.15 mm, and the distortion is shown in the scale of 0.5%.

The imaging optical system LA according to each of Examples includes, in order from the enlargement conjugate side to the reduction conjugate side, a first lens unit B1 having a negative refractive power, a second lens unit B2 having a positive refractive power, a third lens unit B3 having a positive refractive power, a fourth lens unit B4 having a negative refractive power, and a fifth lens unit B5 having a positive refractive power. For focusing, the first lens unit B1 and the fifth lens unit B5 are stationary, and the second lens unit B2, the third lens unit B3, and the fourth lens unit B4 move. In this case, the intermediate imaging position MI is arranged within the third lens unit B3. The third lens unit B3 has an optical action of a field lens for guiding a peripheral, ray to the reduction conjugate side before and after the intermediation imaging position.

The first lens unit B1, which is arranged closest to the enlargement conjugate side, has a large ray angle with respect to the optical axis. Thus, the amount of peripheral light changes depending on the movement of each lens unit in focusing, with the result that the distortion changes. It is accordingly preferred that the first lens unit B1 be stationary. In the fifth lens unit B5, the telecentricity on the image side changes depending on the movement of each lens unit in focusing, with the result that the amount of peripheral light changes. It is accordingly preferred that the fifth lens unit B5 be stationary.

For focusing from a far distance to a close distance, the third lens unit B3 and the fourth lens unit B4 move to the reduction conjugate side, to thereby correct the variations in field curvature caused by focusing from a far distance to a close distance. When the third lens unit B3 and the fourth lens unit B4 move, spherical aberration and coma are generated, but the third lens unit B3 and the fourth lens unit B4 move in the same direction so as to cancel out those aberrations, to thereby reduce the change in aberration as a whole. The second lens unit B2 is arranged in the vicinity of a position at which an off-axis principal ray from the enlargement conjugate side intersects with the optical axis.

In each of Examples, the aperture stop SP is not arranged on the enlargement conjugate side with respect to the intermediate imaging position MI. Thus, the heights of the principal rays for an intermediate image height and a per image height, which pass through the second lens unit B2, are adjusted by the position of the second lens unit B2. The second lens unit B2 corrects the relative variations in field curvature between the intermediate image height and the peripheral image height caused by the movement of each lens unit in focusing. For focusing from a far distance to a close distance, the second lens unit B2 may move to the enlargement conjugate side or the reduction conjugate side depending on a focus movement amount and a correction amount of each of a field curvature variation at the intermediate image height and a field curvature variation at the peripheral image height of the third lens unit B3 and the fourth lens unit B4.

Next, an exemplary configuration according to each of Examples is described. A movement amount of the second lens unit B2, a movement amount of the third lens unit B3, and a movement amount of the fourth lens unit B4 for focusing of the enlargement conjugate point from a far distance to a close distance are represented by A2, A3, and A4, respectively. The third lens unit B3 includes at least one positive lens on the enlargement conjugate side with respect to the intermediate imaging position MI, and at least one positive lens on the reduction conjugate side with respect to the intermediate imaging position MI. A focal length of the third lens unit B3 is represented by f3, and a focal length of the entire system is represented by f.

A distance (difference) between a position at which a principal ray of an off-axis light flux intersects with the optical axis on the enlargement conjugate side with respect to the intermediate imaging position MI and a principal position of the second lens unit B2 on the enlargement conjugate side is represented by X2. A distance (difference) between a position at which the principal ray of the off-axis light flux intersects with the optical axis on the reduction conjugate side with respect to the intermediate imaging position MI and a principal position of the fourth lens unit B4 on the enlargement conjugate side is represented by X4. The entire optical length is represented by L. As used herein, the entire optical length is a distance from a lens surface arranged closest to the enlargement conjugate side to a lens surface arranged closest to the reduction conjugate side.

A focal length of the first lens unit B1 is represented by f1, a focal length of the second lens unit B2 is represented by f2, a focal length of the fourth lens unit B4 is represented by f4, and a focal length of the fifth lens unit B5 is represented by f5. In this case, it is preferred to satisfy at least one of the following conditional expressions.

$$-0.4 < A2/A4 < 0.4 \quad (1)$$

$$0.2 < A3/A4 < 0.9 \quad (2)$$

$$10.0 < f3/|f| < 500.0 \quad (3)$$

$$X2/L < 0.15 \quad (4)$$

$$X4/L < 0.15 \quad (5)$$

$$-15.0 < f1/|f| < -1.0 \quad (6)$$

$$2.0 < f2/|f| < 7.0 \quad (7)$$

$$-15.0 < f4/|f| < -4.0 \quad (8)$$

$$2.0 < f5/|f| 10.0 \quad (9)$$

Next, the technical meaning of each of the above-mentioned conditional expressions is described.

Conditional Expression (1) relates to the ratio of the movement amount of the second lens unit B2 to the movement amount of the fourth lens unit B4. Conditional Expression (2) relates to the ratio of the movement amount of the third lens unit B3 to the movement amount of the fourth lens unit B4.

In the fourth lens unit B4, which is arranged on the reduction conjugate side with respect to the intermediate imaging position MI and in the vicinity of the aperture stop SP, the incident height of the principal ray is low at the peripheral image height and the intermediate image height. Thus, the distortion is less likely to change due to the movement of each lens unit in focusing. It is accordingly preferred to maximize the movement amount A4 of the fourth lens unit B4 in focusing. In order for the third lens unit B3 to correct spherical aberration, coma, and the like generated by the fourth lens unit B4 and to reduce the generation of field curvature, it is preferred to move the third lens unit B3 with the movement amount A3 within the range of Conditional Expression (2).

In order for the second lens unit B2 to move in correlation with the amount of variation in field curvature caused by the movement of the third lens unit B3 and to cancel out the difference in amount of variation in field curvature among the image heights, it is preferred to move the second lens unit B2 with the movement amount A2 within the range of Conditional Expression (1). The third lens unit B3 includes at least one positive lens on the enlargement conjugate side with respect to the intermediate imaging position MI, and at least one positive lens on the reduction conjugate side with respect to the intermediate imaging position MI. Conditional Expression (3) relates to the ratio of the focal length of the third lens unit B3 to the focal length of the entire system.

The third lens unit B3, which has the optical action of the field lens, more greatly bends a ray having a peripheral image height. In this case, with the setting of the paraxial refractive power of the third lens unit B3 to be small as in the range of Conditional Expression (3), when the third lens unit B3 moves, the field curvature at the peripheral image height can be easily changed greatly with almost no influence on focusing. In this manner, the field curvature is easily adjusted.

Conditional Expression (4) relates to the ratio of the distance (difference) between the position at which the principal ray intersects with the optical axis on the enlargement conjugate side with respect to the intermediate imaging position MI and the principal position of the second lens unit B2 on the enlargement conjugate side, to the entire optical length. Conditional Expression (5) relates to the ratio of the distance (difference) between the position at which the principal ray intersects with the optical axis on the reduction conjugate side with respect to the intermediate imaging position MI and the principal position of the fourth lens unit B4 on the enlargement conjugate side, to the entire optical length. In this case, the enlargement conjugate side principal point is a conjugate point at which the lateral magnification is 1 when collimated light enters the lens unit from the reduction conjugate side.

With the arrangement of the second lens unit B2 in the range of Conditional Expression (4), light fluxes from the peripheral image height and the intermediate image height are concentrated at the position of the second lens unit B2. Thus, when the second lens unit B2 moves, the field curvature at the intermediate image height and the peripheral image height can be easily changed in the manner different from that by the third lens unit B3. With the arrangement of the fourth lens unit B4 in the range of Conditional Expression (5), the fourth lens unit B4 is arranged substantially in the vicinity of the aperture stop SP. In this manner, the fourth lens unit B4 is shaped to be concentric to the aperture stop SP, to thereby reduce the change in distortion caused by the movement of the fourth lens unit B4.

Conditional Expression (6) relates to the ratio of the focal length of the first lens unit B1 to the focal length of the entire system. Conditional Expression. (7) relates to the ratio of the focal length of the second lens unit B2 to the length of the entire system. Conditional Expression (8) relates to the ratio of the focal length of the fourth lens unit B4 to the focal length of the entire system. Conditional Expression (9) relates to the ratio of the focal length of the fifth lens unit B5 to the focal length of the entire system.

When f1/|f| exceeds the upper limit of Conditional Expression (6), it is difficult to increase the angle of field. When f1/|f| exceeds the lower limit of Conditional Expression (6) or f2/|f| exceeds the upper limit of Conditional Expression (7) the positive refractive power of the second lens unit B2, which is arranged on the enlargement conjugate side with respect to the intermediate imaging position MI, is too strong, and it is difficult to correct axial chromatic aberration. When f2/|f| exceeds the lower limit of Conditional Expression (7), the entire optical length is too long.

When f4/|f| exceeds the lower limit of Conditional Expression (8) so that the negative refractive power of the fourth lens unit B4 is strong (the absolute value of the negative refractive power is large), the spherical aberration and the distortion are increased in focusing. When f4/|f| exceeds the upper limit of Conditional Expression (8), the movement amount of the fourth lens unit B4 for focusing are increased to increase the entire optical length.

When f5/|f| exceeds the lower limit of Conditional Expression (9), the positive refractive power of the fifth lens unit B5 is increased, and it is difficult to secure a predetermined back focus. When f5/|f| exceeds the upper limit of Conditional Expression (9), the entire optical length on the reduction conjugate side with respect to the intermediate imaging position MI is too long.

In each of Examples, it is more preferred to set the numerical, ranges of Conditional Expressions (1) to (9) as follows.

$$-0.3 < A2/A4 < 0.3 \quad (1a)$$

$$0.3 < A3/A4 < 0.8 \quad (2a)$$

$$20.0 < f3/|f| < 300.0 \quad (3a)$$

$$X2/L < 0.10 \quad (4a)$$

$$X4/L < 0.10 \quad (5a)$$

$$-14.0 < f1/|f| < -1.5 \quad (6a)$$

$$3.0 < f2/|f| 6.0 \quad (7a)$$

$$-14.0 < f4/|f| < -6.0 \quad (8a)$$

$$3.0 < f5/|f| < 8.0 \quad (9a)$$

In the imaging optical system utilizing the intermediate to imaging method, longitudinal aberration has the relationship of addition before and after the intermediate imaging position MI. Thus, it is difficult to achieve achromatism for axial chromatic aberration in particular. In view of this, it is preferred that each of the second lens unit B2, the fourth lens unit B4, and the fifth lens unit B5 include at least one cemented lens formed by cementing a negative lens and a positive lens in order from the enlargement conjugate side to the reduction conjugate side, to thereby correct the chromatic aberration.

The aberration at the peripheral image height is satisfactorily corrected before and after the intermediate imaging position MI. For this reason, it is preferred that the third lens unit B3 include, in order from the enlargement conjugate side to the reduction conjugate side, at least one positive lens having a convex surface facing the enlargement conjugate side at least one negative lens, and at least one positive lens having a convex surface facing the reduction conjugate side. In view of the aberration correction, it is preferred that the first lens unit B1 include at least one meniscus negative lens having a convex surface facing the enlargement conjugate side.

In each of Examples, the lens includes five lens units in total, but modifications may be made as appropriate. For example, a predetermined lens unit may be divided so that the divided lens units move on substantially the same locus for focusing. In this case, it is preferred to move the divided lens units so that a relative movement ratio B thereof roughly satisfies −0.1<B<0.1.

Examples of the present invention are described above, but the present invention is not limited to Examples and can be modified and changed variously within the scope of the gist thereof.

Next, features of each of Examples other than those described above are described. In Example 1, for focusing in which the enlargement conjugate point changes from a far distance to a close distance, all of the second lens unit B2, the third lens unit B3, and the fourth lens unit B4 move to the reduction conjugate side, and the first lens unit B1 and the fifth lens unit B5 are stationary.

In Example 2, for focusing in which the enlargement conjugate point changes from a far distance to a close distance, all, of the second lens unit B2, the third lens unit B3, and the fourth lens unit B4 move to the reduction conjugate side, and the first lens unit B1 and the fifth lens unit B5 are stationary. Further, the meniscus negative lens having an aspherical surface, which is included in the first lens unit B1 in Example 1, is included in the second lens unit B2. With this, a change in ray height within the aspherical surface is utilized to reduce the difference in field curvature between the intermediate image height and the peripheral image height.

In Example 3, the refractive power arrangement and the direction of movement of the second lens unit B2 for focusing are changed from those in Examples 1 and 2. For focusing in which the enlargement conjugate point changes from a far distance to a close distance, both of the third lens unit B3 and the fourth lens unit B4 move to the reduction conjugate side, and the second lens unit B2 moves to the enlargement conjugate side. Satisfactory optical performance can be secured even when the refractive power arrangement and the movement of the lens units are changed within the ranges of the conditional expressions as exemplified in Example 3.

Next, an example in which the imaging optical system according to the present invention is applied to a projection optical system to be used for an image projection apparatus is described with reference to FIG. 7.

In FIG. 7, reference numeral 41 represents a light source. An illumination optical system 42 has a function of realizing illumination with less unevenness for an image displaying element, and aligning the polarization direction of emitted light in an arbitrary direction of P polarization or S polarization. A color separation optical system 43 separates light from the illumination optical system 42 into an arbitrary color corresponding to the image displaying element.

Image displaying elements 47 48, and 49 are each formed by a reflective liquid crystal panel for modulating incident polarized light in accordance with an electric signal so as to form an image. Polarization beam splitters 44 and 45 transmit or reflect light in accordance with the modulation in the image displaying elements 47, 48, and 49. A color composition optical system 46 combines light beams from the image displaying elements 47, 48, and 49 into single light. A projection optical system 50 projects the light combined by the color composition optical system 46 onto a projection target such as a screen 51.

The imaging optical system according to the present invention is used for the projection optical system 50. In this manner, the image projection apparatus in which the change in aberrations is satisfactorily corrected in a wide projection distance range and in which optical performance is satisfactory over the entire screen is obtained.

The exemplary embodiments of the present invention are described above, but the present invention is not limited to those embodiments and can be modified and changed variously within the scope of the gist thereof.

Next, Numerical Examples of the imaging optical systems according to Examples are described. The surface numbers in the lens configurations of Numerical Examples are the numbers attached to the lens surfaces in order from the enlargement conjugate side to the reduction conjugate side. Symbol R represents a curvature radius of each lens surface. Symbol d represents an interval (physical interval) between the lens surface i and the lens surface (i+1) on the out axis. The lens surface marked with "s" on the right side of the surface number represents the position of the aperture stop.

Further, symbols nd and vd represent a refractive index and an Abbe constant for a d-line of the material of each lens, respectively. Symbol "glass" represents a glass material (product name). Symbol $\phi ea$ represents an effective diameter of each lens surface. The focal length (absolute value) of the entire system, the aperture ratio (F-number), and the half angle of field $\omega$ in each of Numerical Examples are also shown.

Note that, in each of Numerical Examples, the value of the focal length of the entire lens system is expressed by the absolute value |f|. The reason is as follows. Because the conjugate point is formed within the lens unit, an erect image is formed on a final imaging plane. Thus, the focal length of the entire system takes a negative value depending on the definition, but the refractive power of the entire system is positive. Therefore, the focal length is expressed by the absolute value.

The lens surface marked with an asterisk (*) on the right side of the surface number represents that the lens surface has an aspherical shape following the function below. The aspherical shape is expressed as follows:

$$x = (y^2/R)/[1+\{1-(1+K)(y^2/R^2)\}^{1/2}] + Ay^4 + By^6 + Cy^8 + Dy^{10} + Ey^{12} + Fy^{14} + Gy^{16}$$

where the x axis corresponds to the optical axis direction, the y axis corresponds to the direction perpendicular to the optical axis, the light propagation direction is positive, r represents a paraxial curvature radius, K represents a conic constant, A, B, C, . . . , represent aspherical coefficients, and E-X means $10^{-x}$.

In the conic constant and the aspherical coefficients, NOi represents the surface number i. Table 1 shows the relations between each of Examples and the numerical values.

NUMERICAL EXAMPLE 1

| |f| = 8.745 Fno = 2.80 Φ = 28 ω = 57.9 | | | | | |
|---|---|---|---|---|---|---|
| no | Φea | R | d | glass | Nd | vd |
| OBJ | 840.00 | | | | | |
| 1 | 63.1 | 71.350 | 3.50 | STIH6 | 1.8118 | 25.4 |
| 2 | 48.7 | 31.307 | 4.50 | | | |
| 3* | 46.5 | 62.073 | 3.20 | LBAL42 | 1.5852 | 59.4 |
| 4* | 35.2 | 12.344 | 34.27 | | | |
| 5 | 12.2 | 274.905 | 2.00 | SLAH60 | 1.8388 | 37.2 |
| 6 | 13.6 | 19.301 | 5.60 | SFPM2 | 1.5971 | 67.7 |
| 7 | 15.2 | −15.621 | 0.95 | | | |
| 8 | 15.4 | −13.472 | 1.50 | STIH6 | 1.8118 | 25.4 |
| 9 | 19.6 | 50.336 | 5.83 | SFPM2 | 1.5971 | 67.7 |
| 10 | 21.9 | −22.244 | 0.50 | | | |
| 11 | 26.9 | 94.153 | 7.71 | SFPL53 | 1.4397 | 94.9 |
| 12 | 28.2 | −23.340 | 28.48 | | | |
| 13 | 41.0 | 56.441 | 6.02 | SNPH1 | 1.8155 | 22.8 |
| 14 | 40.7 | −1222.548 | 0.50 | | | |
| 15 | 38.1 | 26.686 | 7.38 | STIH6 | 1.8118 | 25.4 |
| 16 | 35.2 | 44.485 | 19.75 | | | |
| 17 | 24.7 | −51.973 | 2.00 | SBAL35 | 1.5912 | 61.1 |
| 18 | 24.2 | 28.216 | 9.36 | | | |
| 19* | 27.8 | −341.604 | 3.00 | SBSL7 | 1.5181 | 64.1 |
| 20* | 28.9 | 48.327 | 8.43 | | | |
| 21 | 33.0 | −330.075 | 8.22 | FDS90 | 1.8542 | 23.8 |

-continued

| |f| = 8.745 Fno = 2.80 Φ = 28 ω = 57.9 | | | | | |
|---|---|---|---|---|---|
| 22 | 34.4 | −28.872 | 0.50 | | | |
| 23 | 30.4 | 26.139 | 5.90 | SLAH66 | 1.7758 | 49.6 |
| 24 | 28.5 | 69.577 | 16.92 | | | |
| 25s | 11.7 | 0.000 | 7.49 | (Aperture stop) | | |
| 26 | 11.9 | −19.728 | 1.50 | STIM35 | 1.7038 | 30.1 |
| 27 | 13.8 | 27.913 | 3.90 | SFPM2 | 1.5971 | 67.7 |
| 28 | 15.4 | −28.950 | 3.54 | | | |
| 29 | 17.8 | −22.342 | 1.50 | SLAH60 | 1.8388 | 37.2 |
| 30 | 22.1 | 40.198 | 6.62 | SFPM2 | 1.5971 | 67.7 |
| 31 | 24.6 | −26.299 | 0.50 | | | |
| 32 | 33.3 | 47.508 | 11.13 | SFPM2 | 1.5971 | 67.7 |
| 33 | 34.6 | −34.679 | 0.50 | | | |
| 34* | 34.4 | −110.021 | 4.78 | SLAM60 | 1.7464 | 49.3 |
| 35* | 35.4 | −42.937 | 2.50 | | | |
| 36 | 40.0 | ∞ | 32.00 | SBSL7 | 1.5181 | 64.1 |
| 37 | 40.0 | ∞ | 2.00 | | | |
| 38 | 40.0 | ∞ | 18.00 | SF6 | 1.8119 | 25.4 |
| 39 | 40.0 | ∞ | 5.50 | | | |
| IMG | | | | | | |

| | | | |
|---|---|---|---|
| 1/r | NO3 = 1.6110E−02 | NO4 = 8.1008E−02 | NO19 = −2.9274E−03 |
| | NO20 = 2.0692E−02 | NO34 = −9.0892E−03 | NO35 = −2.3290E−02 |
| K | NO3 = 0.0000E+00 | NO4 = −6.2208E−01 | NO19 = 0.0000E+00 |
| | NO20 = 0.0000E+00 | NO34 = 0.0000E+00 | NO35 = 0.0000E+00 |
| A | NO3 = 2.5934E−05 | NO4 = −4.8889E−05 | NO19 = 7.9382E−05 |
| | NO20 = 9.0390E−05 | NO34 = −1.9458E−05 | NO35 = −1.0980E−05 |
| B | NO3 = −5.3719E−08 | NO4 = 1.9998E−07 | NO19 = −1.6312E−07 |
| | NO20 = −5.0593E−07 | NO34 = −4.5035E−08 | NO35 = −2.4944E−08 |
| C | NO3 = 1.3976E−10 | NO4 = −1.1098E−09 | NO19 = −8.4439E−10 |
| | NO20 = 1.5511E−09 | NO34 = 2.2329E−10 | NO35 = −6.7109E−11 |
| D | NO3 = −2.5252E−13 | NO4 = 5.2350E−12 | NO19 = −5.2043E−12 |
| | NO20 = −1.2019E−11 | NO34 = −7.2439E−13 | NO35 = 3.9244E−13 |
| E | NO3 = 2.1773E−16 | NO4 = −2.5752E−14 | NO19 = 9.4747E−14 |
| | NO20 = 8.8554E−14 | NO34 = 1.5090E−15 | NO35 = −2.9530E−15 |
| F | NO3 = −5.1783E−21 | NO4 = 6.6032E−17 | NO19 = −3.9802E−16 |
| | NO20 = −3.0403E−16 | NO34 = 2.3613E−18 | NO35 = 9.8048E−18 |
| G | NO3 = −8.5250E−23 | NO4 = −6.8633E−20 | NO19 = 5.8023E−19 |
| | NO20 = 3.9255E−19 | NO34 = −7.3025E−21 | NO35 = −1.0669E−20 |

NUMERICAL EXAMPLE 2

| |f| = 8.750 Fno = 2.8 Φ = 28 ω = 57.8 | | | | | |
|---|---|---|---|---|---|
| no | Φea | R | d | glass | Nd | vd |
| OBJ | 840.00 | | | | | |
| 1 | 60.6 | 61.901 | 4.00 | STIH6 | 1.8118 | 25.4 |
| 2* | 44.7 | 27.254 | 4.64 | | | |
| 3* | 40.7 | 31.258 | 3.20 | LBAL42 | 1.5852 | 59.4 |
| 4* | 31.6 | 10.158 | 30.70 | | | |
| 5 | 10.6 | 610.053 | 5.00 | FDS90 | 1.8542 | 23.8 |
| 6 | 13.1 | 23.547 | 4.70 | SFPM2 | 1.5971 | 67.7 |
| 7 | 14.6 | −16.537 | 1.06 | | | |
| 8 | 14.9 | −13.418 | 1.20 | FDS90 | 1.8542 | 23.8 |
| 9 | 18.4 | 110.863 | 5.80 | SFPM2 | 1.5971 | 67.7 |
| 10 | 21.1 | −19.228 | 0.96 | | | |
| 11 | 26.7 | 131.346 | 9.70 | SFPL53 | 1.4397 | 94.9 |
| 12 | 29.6 | −26.221 | 27.59 | | | |
| 13 | 44.2 | 94.117 | 6.30 | SNPH1 | 1.8155 | 22.8 |
| 14 | 44.2 | −147.450 | 0.50 | | | |
| 15 | 42.1 | 29.437 | 7.80 | STIH6 | 1.8118 | 25.4 |
| 16 | 39.4 | 51.717 | 23.98 | | | |
| 17 | 25.3 | −45.558 | 1.50 | SNBH8 | 1.7249 | 34.7 |
| 18 | 25.3 | 42.334 | 6.74 | | | |
| 19* | 28.1 | 500.000 | 3.00 | STIM28 | 1.6936 | 31.1 |
| 20* | 28.8 | 66.463 | 12.60 | | | |
| 21 | 36.6 | −125.583 | 8.50 | FDS90 | 1.8542 | 23.8 |
| 22 | 38.4 | −30.360 | 4.15 | | | |
| 23 | 35.7 | 47.555 | 6.10 | SLAH71 | 1.8558 | 32.3 |
| 24 | 34.5 | −2769.749 | 23.26 | | | |
| 25s | 12.4 | 0.000 | 7.19 | (Aperture stop) | | |
| 26 | 12.1 | −37.669 | 2.50 | SLAH71 | 1.8558 | 32.3 |

-continued

| |f| = 8.750 Fno = 2.8 Φ = 28 ω = 57.8 | | | | | |
|---|---|---|---|---|---|
| 27 | 13.2 | 46.020 | 4.00 | SFPM2 | 1.5971 | 67.7 |
| 28 | 14.9 | −39.203 | 3.44 | | | |
| 29 | 17.4 | −36.974 | 1.50 | SNBH53 | 1.7428 | 32.3 |
| 30 | 20.8 | 21.682 | 6.80 | SFPM2 | 1.5971 | 67.7 |
| 31 | 22.6 | −30.892 | 0.50 | | | |
| 32 | 25.1 | −76000.000 | 2.50 | LBSL7 | 1.5181 | 64.1 |
| 33* | 26.3 | −98.967 | 7.79 | | | |
| 34 | 34.4 | −1088.623 | 8.80 | SLAH66 | 1.7758 | 49.6 |
| 35 | 35.9 | −29.670 | 2.50 | | | |
| 36 | 40.0 | ∞ | 32.00 | SBSL7 | 1.5181 | 64.1 |
| 37 | 40.0 | ∞ | 2.00 | | | |
| 38 | 40.0 | ∞ | 18.00 | SF6 | 1.8119 | 25.4 |
| 39 | 40.0 | ∞ | 5.50 | | | |
| IMG | | | | | | |

| | | | |
|---|---|---|---|
| 1/r | NO2 = 3.6692E−02 | NO3 = 3.1992E−02 | NO4 = 9.8444E−02 |
| | NO19 = 2.0000E−03 | NO20 = 1.5046E−02 | NO34 = −1.0104E−02 |
| K | NO2 = 0.0000E+00 | NO3 = 0.0000E+00 | NO4 = −6.9922E−01 |
| | NO19 = 0.0000E+00 | NO20 = 0.0000E+00 | NO34 = 0.0000E+00 |
| A | NO2 = 1.0672E−05 | NO3 = 4.0941E−05 | NO4 = −5.3674E−05 |
| | NO19 = 4.2257E−05 | NO20 = 7.2790E−05 | NO34 = 1.3948E−05 |
| B | NO2 = −1.4531E−08 | NO3 = −8.7913E−08 | NO4 = 2.8073E−07 |
| | NO19 = 2.2724E−08 | NO20 = −3.6838E−07 | NO34 = 1.0937E−08 |
| C | NO2 = −1.6255E−11 | NO3 = 1.1724E−10 | NO4 = −1.8800E−09 |
| | NO19 = −1.1234E−09 | NO20 = 1.3362E−09 | NO34 = −1.3559E−10 |
| D | NO2 = −2.6540E−14 | NO3 = −2.2828E−13 | NO4 = 4.1721E−12 |
| | NO19 = −4.9883E−12 | NO20 = −1.2455E−11 | NO34 = 1.1651E−12 |
| E | NO2 = −1.6977E−17 | NO3 = 1.8589E−16 | NO4 = −7.1972E−15 |
| | NO19 = 9.3183E−14 | NO20 = 8.9472E−14 | NO34 = −5.7383E−15 |
| F | NO2 = 0.0000E+00 | NO3 = 0.0000E+00 | NO4 = 0.0000E+00 |
| | NO19 = −3.9797E−16 | NO20 = −3.0403E−16 | NO34 = 9.9706E−18 |
| G | NO2 = 0.0000E+00 | NO3 = 0.0000E+00 | NO4 = 0.0000E+00 |
| | NO19 = 5.8023E−19 | NO20 = 3.9255E−19 | NO34 = 0.0000E+00 |

NUMERICAL EXAMPLE 3

| |f| = 8.794 Fno = 2.80 Φ = 28 ω = 57.7 | | | | | |
|---|---|---|---|---|---|
| no | Φea | R | d | glass | Nd | vd |
| OBJ | 840.00 | | | | | |
| 1 | 64.9 | 45.972 | 4.00 | STIH6 | 1.812 | 25.4 |
| 2* | 49.7 | 29.724 | 6.00 | | | |
| 3* | 46.0 | 43.878 | 3.50 | SBSL7 | 1.518 | 64.1 |
| 4* | 33.6 | 11.246 | 29.77 | | | |
| 5 | 8.6 | −105.952 | 2.00 | FDS90 | 1.854 | 23.8 |
| 6 | 9.8 | 25.424 | 3.46 | SFPM2 | 1.597 | 67.7 |
| 7 | 11.2 | −16.525 | 0.91 | | | |
| 8 | 11.5 | −12.828 | 2.00 | FDS90 | 1.854 | 23.8 |
| 9 | 15.1 | 54.446 | 6.74 | SFPM2 | 1.597 | 67.7 |
| 10 | 19.2 | −16.459 | 0.67 | | | |
| 11 | 25.1 | 101.319 | 9.20 | SFPL53 | 1.440 | 94.9 |
| 12 | 28.1 | −24.889 | 25.42 | | | |
| 13 | 44.3 | 95.263 | 6.26 | SNPH1 | 1.816 | 22.8 |
| 14 | 44.4 | −115.913 | 0.50 | | | |
| 15 | 41.5 | 27.076 | 7.74 | STIH6 | 1.812 | 25.4 |
| 16 | 38.8 | 44.805 | 20.83 | | | |
| 17 | 25.8 | −37.907 | 1.50 | SBAL35 | 1.591 | 61.1 |
| 18 | 25.4 | 52.144 | 26.73 | | | |
| 19 | 29.9 | −135.773 | 2.00 | SNBH5 | 1.658 | 39.7 |
| 20 | 30.8 | 93.142 | 2.48 | | | |
| 21 | 31.1 | −174.924 | 5.27 | FDS90 | 1.854 | 23.8 |
| 22 | 32.2 | −39.130 | 0.50 | | | |
| 23 | 32.5 | 43.367 | 6.02 | SLAH71 | 1.856 | 32.3 |
| 24 | 31.7 | −349.973 | 24.49 | | | |
| 25s | 14.5 | ∞ | 13.85 | (Aperture stop) | | |
| 26 | 15.6 | −27.767 | 2.00 | STIH14 | 1.768 | 26.5 |
| 27 | 17.6 | 66.244 | 4.06 | SFPM2 | 1.597 | 67.7 |
| 28 | 19.1 | −31.732 | 3.94 | | | |
| 29 | 20.6 | −19.383 | 1.50 | SNBH8 | 1.725 | 34.7 |
| 30 | 25.8 | 95.059 | 6.37 | SFPM2 | 1.597 | 67.7 |
| 31 | 28.1 | −30.892 | 0.50 | | | |

-continued

| |f| = 8.794 Fno = 2.80 Φ = 28 ω = 57.7 | | | | | |
|---|---|---|---|---|---|
| 32 | 31.0 | −85.334 | 3.54 | SFPM2 | 1.597 | 67.7 |
| 33 | 32.6 | −46.532 | 0.50 | | | |
| 34 | 38.1 | 67.107 | 9.34 | SFPM2 | 1.597 | 67.7 |
| 35 | 38.6 | −42.842 | 0.50 | | | |
| 36* | 37.8 | ∞ | 3.40 | SBAL42 | 1.585 | 59.4 |
| 37 | 37.8 | −112.400 | 2.50 | | | |
| 38 | 40.0 | ∞ | 32.00 | SBSL7 | 1.518 | 64.1 |
| 39 | 40.0 | ∞ | 2.00 | | | |
| 40 | 40.0 | ∞ | 18.00 | SF6 | 1.812 | 25.4 |
| 41 | 40.0 | ∞ | 13.46 | | | |

| IMG | | | | |
|---|---|---|---|---|
| no | 2 | 3 | 4 | 37 |
| 1/r | 3.3643E−02 | 2.2790E−02 | 8.8921E−02 | 0.0000E+00 |
| K | 0.0000E+00 | 0.0000E+00 | −7.3246E−01 | 0.0000E+00 |
| A | 2.0288E−06 | 2.7333E−05 | 9.8048E−06 | −4.7344E−06 |
| B | −4.8136E−10 | −3.8931E−08 | 1.5646E−07 | −3.7650E−10 |
| C | 1.0203E−11 | 3.0928E−11 | −1.3118E−09 | −6.8090E−12 |
| D | −1.2931E−14 | 4.9010E−14 | 1.4005E−12 | 1.0441E−14 |
| E | 1.6020E−17 | −7.9231E−17 | 2.2631E−17 | −1.2792E−17 |
| F | 0.0000E+00 | 0.0000E+00 | 0.0000E+00 | 0.0000E+00 |
| G | 0.0000E+00 | 0.0000E+00 | 0.0000E+00 | 0.0000E+00 |

TABLE 1

(Numerical value table)

| | Example 1 | Example 2 | Example 3 |
|---|---|---|---|
| Focal length of entire system f | 8.745 | 8.750 | 8.734 |
| FNO | 2.80 | 2.80 | 2.80 |
| Half angle of field (degree) | 57.87 | 57.85 | 57.65 |
| Focal length of first lens unit f1 | −18.55 | −63.25 | −116.43 |

TABLE 1-continued

| | | | |
|---|---|---|---|
| Focal length of second lens unit f2 | 43.13 | 41.70 | 35.76 |
| Focal length of third lens unit f3 | 256.18 | 1,000.36 | 917.03 |
| Focal length of fourth lens unit f4 | −61.15 | −85.26 | −105.72 |
| Focal length of fifth lens unit f5 | 30.72 | 33.56 | 37.96 |

(Values of conditional expressions)

| Conditional Expression | | Example 1 | Example 2 | Example 3 |
|---|---|---|---|---|
| (1) | A2/A4 | 0.27 | 0.11 | −0.22 |
| (2) | A3/A4 | 0.71 | 0.43 | 0.47 |
| (3) | f3/f | 29.36 | 115.21 | 105.48 |
| (4) | X2/L | 0.0827 | 0.054 | 0.045 |
| (5) | X4/L | 0.0115 | 0.004 | 0.053 |
| (6) | f1/f | −2.13 | −7.28 | −13.39 |
| (7) | f2/f | 4.94 | 4.80 | 4.11 |
| (8) | f4/f | 7.01 | −9.82 | −12.16 |
| (9) | f5/f | 3.52 | 3.87 | 4.37 |

While the present invention has been described with reference to exemplary embodiments, it is to be understood that the invention is not limited to the disclosed exemplary embodiments The scope of the following claims is to be accorded the broadest interpretation so as to encompass all such modifications and equivalent structures and functions.

This application claims the benefit of Japanese Patent Application No. 2014-026485, filed Feb. 14, 2014, which is hereby incorporated by reference herein in its entirety.

What is claimed is:

1. An imaging optical system comprising:
   in order from an enlargement conjugate side to a reduction conjugate side:
   a first lens unit having a negative refractive power;
   a second lens unit having a positive refractive power;
   a third lens unit having a positive refractive power;
   a fourth lens unit having a negative refractive power; and
   a fifth lens unit having a positive refractive power,
   wherein the first lens unit and the fifth lens unit are configured to be stationary during focusing,
   wherein each of the second lens unit, the third lens unit, and the fourth lens unit is configured to move with changing a distance between that and an adjacent lens unit during focusing, and
   wherein the imaging optical system is configured so that both of an enlargement conjugate plane on the enlargement conjugate side and a reduction conjugate plane on the reduction conjugate side are conjugate with an intermediate imaging plane that is arranged between the enlargement conjugate plane and the reduction conjugate plane.

2. An imaging optical system according to claim 1, wherein the intermediate imaging plane is arranged in an optical path within the third lens unit.

3. An imaging optical system according to claim 1, wherein the third lens unit and the fourth lens unit are configured to move to the reduction conjugate side during focusing from infinity to a close distance.

4. An imaging optical system according to claim 1, wherein the following conditional expressions are satisfied:

$$-0.4 < A2/A4 < 0.4; \text{ and}$$

$$0.2 < A3/A4 < 0.9,$$

where A2 represents a movement amount of the second lens unit, A3 represents a movement amount of the third lens unit, and A4 represents a movement amount of the fourth lens unit during focusing from infinity to a close distance.

5. An imaging optical system according to claim 1, wherein the intermediate imaging plane is arranged in an optical path within the third lens unit,
   wherein the third lens unit comprises at least one positive lens on the enlargement conjugate side with respect to the intermediate imaging plane and at least one positive lens on the reduction conjugate side with respect to the intermediate imaging plane, and
   wherein the following conditional expression is satisfied:

$$10.0 < f3/|f| < 500.0,$$

where f3 represents a focal length of the third lens unit, and f represents a focal length of the entire imaging optical system.

6. An imaging optical system according to claim 1, wherein the following conditional expressions are satisfied:

$$X2/L < 0.15; \text{ and}$$

$$X4/L < 0.15,$$

where X2 represents a distance between a position at which a principal ray of an off-axis light flux intersects with an optical axis on the enlargement conjugate side with respect to the intermediate imaging plane and a principal position of the second lens unit on the enlargement conjugate side, X4 represents a distance between a position at which the principal ray of the off-axis light flux intersects with the optical axis on the reduction conjugate side with respect to the intermediate imaging plane and a principal position of the fourth lens unit on the enlargement conjugate side, and L represents an entire optical length.

7. An imaging optical system according to claim 1, wherein the following conditional expressions are satisfied:

$$-15.0 < f1/|f| < -1.0;$$

$$2.0 < f2/|f| < 7.0;$$

$$-15.0 < f4/|f| < -4.0; \text{ and}$$

$$2.0 < f5/|f| < 10.0,$$

where f1 represents a focal length of the first lens unit, f2 represents a focal length of the second lens unit, f4 represents a focal length of the fourth lens unit, f5 represents a focal length of the fifth lens unit, and f represents a focal length of the entire imaging optical system.

8. An imaging optical system according to claim 1, wherein the first lens unit comprises at least one meniscus negative lens having a convex surface facing the enlargement conjugate side.

9. An imaging optical system according to claim 1, wherein each of the second lens unit, the fourth lens unit, and the fifth lens unit comprises a cemented lens, the cemented lens comprising, in order from the enlargement conjugate side to the reduction conjugate side, a negative lens and a positive lens that are cemented with each other.

10. An imaging optical system according to claim 1, wherein the third lens unit comprises, in order from the enlargement conjugate side to the reduction conjugate side, at least one positive lens having a convex surface facing the enlargement conjugate side, at least one negative lens, and a positive lens having a convex surface facing the reduction conjugate side.

11. An image projection apparatus, comprising:
   an imaging optical system configured so that both of an enlargement conjugate plane on an enlargement conjugate side and a reduction conjugate plane on a reduction conjugate side are conjugate with an intermediate imaging plane that is arranged between the enlargement conjugate plane and the reduction conjugate plane; and an image displaying element configured to form an original image, wherein the imaging optical system comprises, in order from the enlargement conjugate side to the reduction conjugate side:

a first lens unit having a negative refractive power;
a second lens unit having a positive refractive power;
a third lens unit having a positive refractive power;
a fourth lens unit having a negative refractive power; and
a fifth lens unit having a positive refractive power, wherein the first lens unit and the fifth lens unit are configured to be stationary during focusing, wherein each of the second lens unit, the third lens unit, and the fourth lens unit is configured to move with changing a distance between that and an adjacent lens unit during focusing, and wherein the imaging optical system is configured to project the original image formed by the image displaying element.

12. An imaging optical system comprising:
a first optical unit closest to an enlargement conjugate side;
a final optical unit closest to a reduction conjugate side; and
a plurality of optical units which can move and are arranged between the first optical unit and the final optical unit, wherein the first optical unit and the final optical unit are configured to be stationary during focusing, wherein each of the plurality of optical units is configured to move with changing a distance between that and an adjacent lens unit during focusing, and wherein the imaging optical system is configured so that both of an enlargement conjugate plane on the enlargement conjugate side and a reduction conjugate plane on the reduction conjugate side are conjugate with an intermediate imaging plane that is arranged between the enlargement conjugate plane and the reduction conjugate plane.

13. An imaging optical system according to claim 12, wherein the imaging optical system comprises:
a first lens unit having a negative refractive power as the first optical unit;
a second lens unit having a positive refractive power as a part of the plurality of optical units;
a third lens unit having a positive refractive power as a part of the plurality of optical units;
a fourth lens unit having a negative refractive power as a part of the plurality of optical units; and
a fifth lens unit having a positive refractive power as the final optical unit, wherein the first lens unit and the fifth lens unit are configured to be stationary during focusing, and wherein each of the second lens unit, the third lens unit, and the fourth lens unit is configured to move with changing a distance between that and an adjacent lens unit during focusing.

14. An imaging optical system according to claim 13, wherein the intermediate imaging plane is arranged in an optical path within the third lens unit.

15. An imaging optical system according to claim 13, wherein the third lens unit and the fourth lens unit are configured to move to the reduction conjugate side during focusing from infinity to a close distance.

16. An imaging optical system according to claim 13, wherein the following conditional expressions are satisfied:

$$-0.4 < A2/A4 < 0.4; \text{ and}$$

$$0.2 < A3/A4 < 0.9,$$

where A2 represents a movement amount of the second lens unit, A3 represents a movement amount of the third lens unit, and A4 represents a movement amount of the fourth lens unit during focusing from infinity to a close distance.

17. An imaging optical system according to claim 13, wherein the intermediate imaging plane is arranged in an optical path within the third lens unit, wherein the third lens unit comprises at least one positive lens on the enlargement conjugate side with respect to the intermediate imaging plane and at least one positive lens on the reduction conjugate side with respect to the intermediate imaging plane, and wherein the following conditional expression is satisfied:

$$10.0 < f3/|f| < 500.0,$$

where f3 represents a focal length of the third lens unit, and f represents a focal length of the entire imaging optical system.

18. An imaging optical system according to claim 13, wherein the following conditional expressions are satisfied:

$$X2/L < 0.15; \text{ and}$$

$$X4/L < 0.15,$$

where X2 represents a distance between a position at which a principal ray of an off-axis light flux intersects with an optical axis on the enlargement conjugate side with respect to the intermediate imaging plane and a principal position of the second lens unit on the enlargement conjugate side, X4 represents a distance between a position at which the principal ray of the off-axis light flux intersects with the optical axis on the reduction conjugate side with respect to the intermediate imaging plane and a principal position of the fourth lens unit on the enlargement conjugate side, and L represents an entire optical length.

19. An imaging optical system according to claim 13, wherein the following conditional expressions are satisfied:

$$-15.0 < f1/|f| < -1.0;$$

$$2.0 < f2/|f| < 7.0;$$

$$-15.0 < f4/|f| < -4.0; \text{ and}$$

$$2.0 < f5/|f| < 10.0,$$

where f1 represents a focal length of the first lens unit, f2 represents a focal length of the second lens unit, f4 represents a focal length of the fourth lens unit, f5 represents a focal length of the fifth lens unit, and f represents a focal length of the entire imaging optical system.

20. An imaging optical system according to claim 13, wherein the first lens unit comprises at least one meniscus negative lens having a convex surface facing the enlargement conjugate side.

21. An imaging optical system according to claim 13, wherein each of the second lens unit, the fourth lens unit, and the fifth lens unit comprises a cemented lens, the cemented lens comprising, in order from the enlargement conjugate side to the reduction conjugate side, a negative lens and a positive lens that are cemented with each other.

22. An imaging optical system according to claim 13, wherein the third lens unit comprises, in order from the enlargement conjugate side to the reduction conjugate side, at least one positive lens having a convex surface facing the enlargement conjugate side, at least one negative lens, and a positive lens having a convex surface facing the reduction conjugate side.

23. An image projection apparatus, comprising:
an imaging optical system configured so that both of an enlargement conjugate plane on an enlargement conjugate side and a reduction conjugate plane on a reduction conjugate side are conjugate with an intermediate imaging plane that is arranged between the enlargement conjugate plane and the reduction conjugate plane; and
an image displaying element configured to form an original image,
wherein the imaging optical system comprises:
a first optical unit closest to an enlargement conjugate side;
a final optical unit closest to a reduction conjugate side; and
a plurality of optical units which can move and are arranged between the first optical unit and the final optical unit,
wherein the first optical unit and the final optical unit are configured to be stationary during focusing,
wherein each of the plurality of optical units is configured to move with changing a distance between that and an adjacent lens unit during focusing, and
wherein the imaging optical system is configured to project the original image formed by the image displaying element.

* * * * *